United States Patent

Richards et al.

[11] Patent Number: 5,231,322
[45] Date of Patent: Jul. 27, 1993

[54] CARTRIDGE BRUSH WITH INTEGRAL FILTER INDUCTOR

[75] Inventors: Monica Richards, Southfield; Robert J. Mohan, Canton, both of Mich.

[73] Assignee: Ford Motor Company, Dearborn, Mich.

[21] Appl. No.: 925,821

[22] Filed: Aug. 7, 1992

[51] Int. Cl.⁵ .......................................... H02K 5/24
[52] U.S. Cl. ...................................... 310/51; 310/43; 310/44; 310/71; 310/72; 310/239
[58] Field of Search ............... 310/220, 51, 248, 68 R, 310/72, 249, 239, 242, 245, 247, 43, 44, 71

[56] References Cited

U.S. PATENT DOCUMENTS

| | | |
|---|---|---|
| 2,334,722 | 11/1943 | Mirick ................................. 310/72 |
| 2,453,114 | 11/1948 | Brandt . |
| 2,548,631 | 4/1951 | Stapleton . |
| 3,005,078 | 10/1961 | Mottu et al. . |
| 4,329,612 | 5/1982 | Averill . |
| 4,340,831 | 7/1982 | Kuhlmann ....................... 310/68 R |
| 4,342,931 | 8/1982 | Grossman .................... 310/239 UX |
| 4,342,934 | 8/1982 | van Wijhe ........................... 310/239 |
| 4,384,223 | 5/1983 | Zelt ................................. 310/68 R |
| 4,554,476 | 11/1985 | Gotoh . |
| 4,590,398 | 5/1986 | Nagamatsu . |
| 4,638,204 | 1/1987 | Kirchner ............................ 310/239 |
| 4,746,828 | 5/1988 | Nado et al. . |
| 4,748,356 | 5/1988 | Okashiro ............................. 310/72 |
| 4,845,393 | 7/1989 | Burgess et al. . |
| 5,081,386 | 1/1992 | Iwai ................................... 310/239 |

FOREIGN PATENT DOCUMENTS

| | | | |
|---|---|---|---|
| 0415367 | 3/1991 | European Pat. Off. ............. 310/51 |
| 0153260 | 11/1980 | Japan ................................ 310/51 |

Primary Examiner—R. Skudy
Attorney, Agent, or Firm—Roger L. May; Paul K. Godwin, Jr.

[57] ABSTRACT

A brush device, comprising a brush holder and a brush assembly, for providing electrical contact with a moving part while suppressing electrical noise generated during the interaction of the brush device with the moving part. The brush holder includes a housing adapted to receive a brush assembly within the housing, and noise suppression arrangement, mounted on the housing and electrically connected to a brush assembly, for suppressing electrical noise generated during the interaction of the brush assembly and the moving part by providing an inductive impedance in the electrical path of the brush assembly. The brush holder may further include a connector cap, electrically connected to the noise suppression arrangement, adapted to provide a mating connection between the noise suppression arrangement and an external connector. The brush assembly is positioned within the housing such that sliding electrical contact is made with the moving part.

20 Claims, 2 Drawing Sheets

CARTRIDGE BRUSH WITH INTEGRAL FILTER INDUCTOR

BACKGROUND OF THE INVENTION

This invention relates generally to devices for suppressing electromagnetic interference (EMI) in direct current machines, and more particularly, to the integration of a highly reliable, inexpensive suppression device into the structure of a brush holder. Such a brush holder is used to hold a brush of the type which makes a sliding electrical contact with a moving part.

Electromagnetic interference is commonly generated by dynamic electrical connections, such as the changing connections produced by the relative movement between the brushes and commutator of an electric motor or generator. The rapid changes in the electric and associated magnetic fields caused by the electrical switching EMI can interfere with the operation of other electrical systems, particularly digital systems operating at low voltage and low current levels.

Commonly, EMI problems are solved by adding noise suppression circuitry to each system which may be affected by the noise, rather than by reducing the noise at the source of the EMI. Such solutions are costly and result in circuit complexity since each system requires individual protection.

A more cost efficient and reliable means of solving the problem is to suppress EMI emissions at their source. Prior arrangements for suppressing EMI at the source have been made. For example, U.S. Pat. No. 2,453,114, issued May 16, 1945 to Brandt, teaches the integration of a capacitor into the structure of a brush holder. The integral capacitor/brush holder is comprised of a hollow casing made of insulative material and an outer electrically conductive layer acting as one capacitor plate. The capacitor shunts the high frequency EMI to ground through a low impedance path. While the Brandt patent teaches a means to suppress EMI at the source, it is neither a simple nor low cost solution. First, a good electrical connection to ground near the EMI source is necessary for effective capacitive filtering. Therefore, when a good ground connection is not readily available, or it is undesirable for some reason to inject EMI into ground, capacitive filtering is not necessarily the most effective EMI suppression technique. Second, the materials and manufacturing processes involved in constructing a capacitor of the type shown in Brandt are expensive, complex and time-consuming. For example, the physical dimensions of a capacitor are usually proportional to its capacitive value. Therefore, separate tooling and material processing may be required to construct Brandt casings of various capacitive values. As a result of the limited flexibility in constructing Brandt type casings, the flexibility to design the EMI filter to operate over specific frequency ranges is also limited.

Accordingly, there is a need for a highly reliable, inexpensive, improved suppression device integral to a small electric machine brush holder, to suppress the EMI commonly generated by such machines.

SUMMARY OF THE PRESENT INVENTION

This need is met by the present invention, whereby a highly reliable, inexpensive, improved suppression device integral to a small electric machine brush holder is provided to suppress the EMI commonly generated by such machines. The brush device comprises a brush holder and a brush assembly.

The brush holder includes a housing, which may be substantially tubular, and noise suppression means, mounted on the housing and electrically connected to a brush assembly. The noise suppression means suppresses electrical noise generated during the interaction of the brush assembly and the moving part by providing an inductive impedance in the electrical path of the brush. Such noise suppression means may comprise an electrically conductive coil wound about the housing. The housing can be formed from low reluctance material and, further, act as a core for the coil.

The brush holder may further include a connector cap, electrically connected to the noise suppression means and adapted to provide a mating connection between the noise suppression means and an external connector. Such a connector cap may also be mounted on the housing.

The brush assembly, positioned within the housing, may include a brush of the type used to make sliding electrical contact with a moving part, and terminal means for connecting the brush to the noise suppression means. A spring means, interposed between the terminal means and the brush, may also be included for biasing the brush toward the moving part to make electrical contact therewith. Such a brush assembly may further include engaging means for engaging the housing. The engaging means may comprise an opening defined in the housing through which the noise suppression means is electrically connected to the terminal means. The terminal means comprising a substantially L-shaped terminal having longer and shorter portions, and a shunt wire connecting the brush to the shorter portion of the terminal. A locking tab on the longer portion of the terminal engages the opening in the housing when the brush assembly is inserted into the housing.

DETAILED DESCRIPTION OF THE PREFERRED EMBODIMENT

Figure 1:
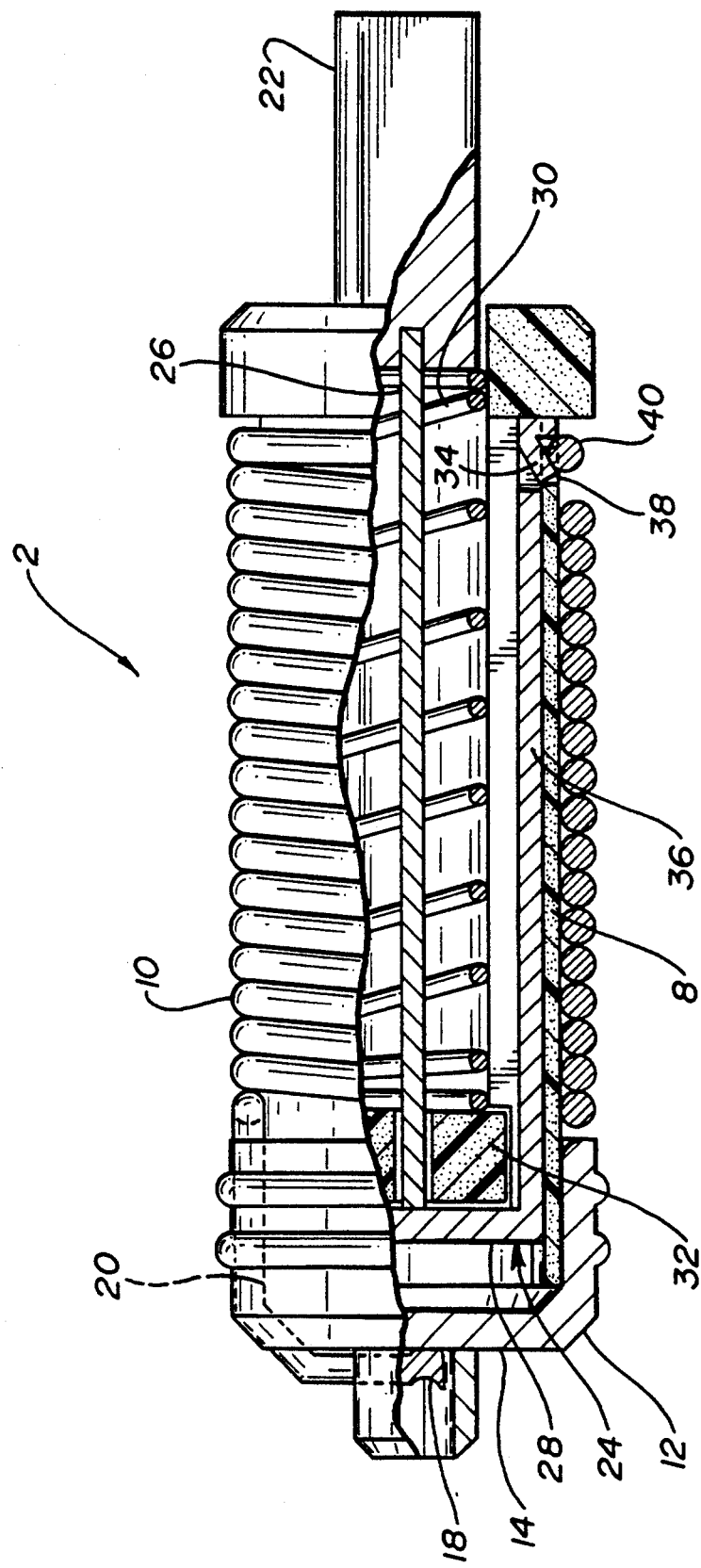
FIG. 1 is a side view of a brush device of the present invention with the lower portion of the brush device in section to illustrate more clearly the construction of the device.
Figure 2:
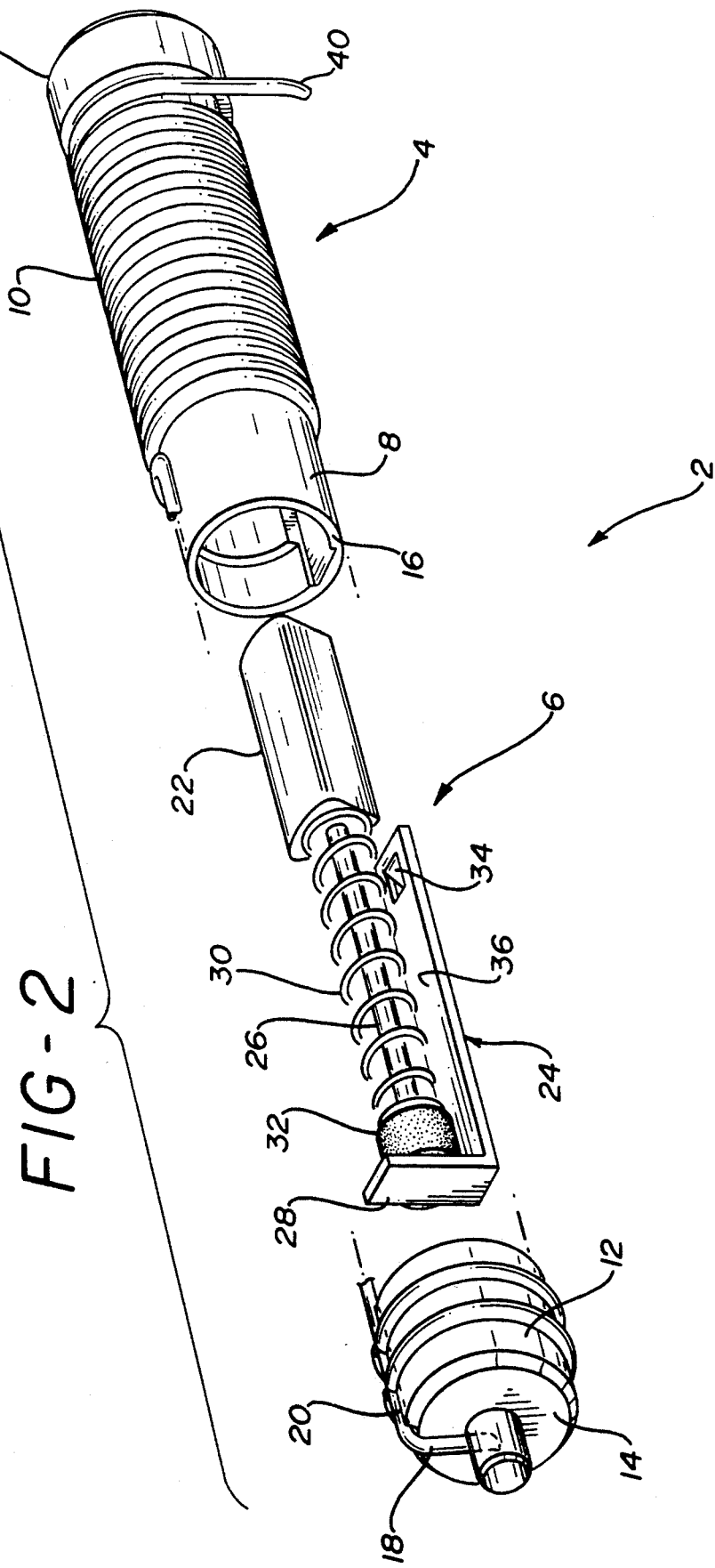
FIG. 2 is an exploded, perspective view of the brush device of FIG. 1, illustrating the interrelationship of the brush holder and brush assembly.

The brush device of the present invention, shown in FIGS. 1 and 2, and generally designated by the reference numeral 2, provides electrical contact with a moving part, such as a commutator, while suppressing electrical noise generated by the interaction of the brush device with the moving part. The brush device comprises a brush holder, generally designated by the reference numeral 4 in FIG. 2, and a brush assembly, generally designated by the reference numeral 6 in FIG. 2.

The brush holder 4 includes a housing 8, a portion of which is shown in section (FIG. 1), preferably generally tubular, adapted to receive a brush assembly 6 therein; and noise suppression means, mounted on the housing 8 and electrically connected to a brush assembly 6, for suppressing electrical noise generated during the interaction of the brush assembly 6 and the moving part. The noise suppression means, comprising an electrically conductive coil 10 wound about the housing 8, provides an inductive impedance in the electrical path between the brush assembly 6 and an external connector (not shown). The inductance of the coil 10 depends on several factors, e.g., the number of windings, the conductivity of the conductor, the cross-sectional area of the conductor, and the material composition of the housing.

The inductance of the coil 10 may be selected so that the electrical noise suppressed by the brush device 2 is within specific frequency ranges. The electrical noise suppression characteristics are further enhanced if the housing 8 is formed from low reluctance material, such as ferrite impregnated plastic, so that the housing acts as a core for the coil 10.

Preferably, the brush holder 4 further includes a connector cap 12, electrically connected to the noise suppression means, adapted to provide a mating connection between the noise suppression means and the external connector (not shown). As shown in FIG. 2, the connector cap 12 is made of conductive metal and is substantially cylindrical with the closed end 14 forming a truncated cone. After the brush assembly 6 has been inserted into the housing 8, the connector cap 12 is mounted on the housing 8 such that it seals the first end 16 of the housing 8. The electrical connection between the coil 10 and the connector cap 12 is completed by feeding the first end 18 of the coil 10 through a channel 20 in the connector cap 12 and then mechanically securing it to the closed end 14 of the connector cap 12.

The brush assembly 6 includes a brush 22 of the type used to make sliding electrical connection with a moving part; and terminal means for connecting the brush 22 to the coil 10. The terminal means includes a substantially L-shaped terminal 24 having longer and shorter portions, and a shunt wire 26 connecting the brush 22 to the shorter portion 28 of the terminal 24. The brush assembly 6 further includes spring means, interposed between the terminal 24 and the brush 22, for biasing the brush 22 toward the moving part to make electrical contact therewith. The spring means, as shown in FIG. 2, comprises a spring 30 attached to a ferrite bead 32. As is well known in the art, a ferrite bead adds series inductance to the electrical path of a conductor passing through its center, and provides very high frequency noise suppression. The shunt wire 26 passes through the centers of both the spring 30 and the ferrite bead 32.

The brush assembly 6 further includes engaging means, comprising a locking tab 34 on the longer portion 36 of the terminal 24, for engaging the housing 8. In the preferred embodiment, the housing 8 defines an opening 38 through which coil 10 is electrically connected to the longer portion 36 of the terminal 24. The locking tab 34 engages the opening 38 in the housing 8 once the brush assembly 6 is fully inserted into the first end 16 of the housing 8. The second end 40 of the coil 10 is then electrically and mechanically connected to the locking tab 34 through the opening 38. This completes the electrical path between the brush assembly 6 and the connector cap 12 through the coil 10. Once the locking tab 34 has engaged the opening 38 in the housing 8, the brush assembly 6 is positioned within the housing 8. Sliding electrical contact may be made with the moving part by the brush 22 which protrudes from the second end 42 of the housing 8.

Having described the invention in detail and by reference to the preferred embodiment thereof, it will be apparent that other modifications and variations are possible without departing from the scope of the invention defined in the appended claims. For example, it is contemplated by this invention that the construction of the brush assembly may be varied to accommodate differing engaging means, such as a threaded coupling. Accordingly, it is the appended claims, including all equivalents, which are meant to define the scope of the present invention.

What is claimed is:

1. A brush holder for holding a brush assembly which makes sliding electrical contact with a moving part, and providing electrical contact thereto for an external connector, said brush holder including:

a housing adapted to receive said brush assembly therein and comprising plastic impregnated with ferrite and having a low reluctance;

and noise suppression means, mounted on said housing and electrically connected to said brush assembly, for suppressing electrical noise generated during interaction of said brush assembly and said moving part, said noise suppression means providing an inductive impedance between said brush assembly and said external connector.

2. A brush holder according to claim 1 wherein said housing is substantially tubular.

3. A brush holder according to claim 1 wherein said noise suppression means comprises an electrically conductive coil wound about said housing, and said housing acts as a core for said coil.

4. A brush holder according to claim 1 further including a connector cap electrically connected to said noise suppression means, said connector cap adapted to provide a mating connection between said noise suppression means and said external connector.

5. A brush holder according to claim 4 wherein said connector cap is mounted on said housing.

6. A brush device for making sliding electrical contact with a moving part, said brush device comprising:

a brush assembly, and a brush holder including a substantially tubular housing comprising plastic impregnated with ferrite and having a low reluctance, and noise suppression means, mounted on said housing and electrically connected to said brush assembly, for suppressing electrical noise generated during interaction of said brush assembly and said moving part, said noise suppression means providing an inductive impedance between said brush assembly and an external connector; and said brush assembly is positioned within said housing such that sliding electrical contact is made with said moving part.

7. A brush device according to claim 6 wherein said noise suppression means comprises an electrically conductive coil wound about said housing, and said housing acts as a core for said coil.

8. A brush device for making sliding electrical contact with a moving part, said brush device comprising:

a brush assembly, and a brush holder including a substantially tubular housing, and noise suppression means, mounted on said housing and electrically connected to said brush assembly, for suppressing electrical noise generated during interaction of said brush assembly and said moving part, said noise suppression means providing an inductive impedance in the electrical path between said brush assembly and an external connector; and said brush assembly is positioned within said housing such that sliding electrical contact is made with said moving part, and said brush assembly includes a brush for making sliding electrical contact with a moving part, and a terminal for electrically connecting said brush to said noise suppression means.

9. A brush device according to claim 8 wherein said brush assembly further includes engaging means for engaging said housing.

10. A brush device according to claim 9 wherein said housing defines an opening through which said noise suppression means is electrically and mechanically connected to said terminal, said terminal is substantially of an L-shape having longer and shorter portions, and said engaging means comprises a locking tab on the longer portion of said terminal, said engaging means engages said opening when said brush assembly is inserted into said housing.

11. A brush device according to claim 9 further comprising a shunt wire connecting said terminal to said brush.

12. A brush device according to claim 11 wherein said brush assembly further includes spring means, interposed between said brush and said terminal, for biasing said brush toward said moving part to make electrical contact therewith.

13. A brush device according to claim 8 wherein said brush holder further includes a connector cap electrically connected to said noise suppression means; said connector cap adapted to provide a mating connection between said noise suppression means and said external connector.

14. A brush device according to claim 13 wherein said connector cap is mounted on said housing.

15. A brush device for providing electrical contact with a moving part while suppressing electrical noise generated during the interaction of said brush device with the moving part, said brush device comprising:

a brush assembly, and a brush holder including a substantially tubular housing comprising plastic impregnated with ferrite and having a low reluctance, noise suppression means, mounted on said housing and electrically connected to a brush assembly, for suppressing electrical noise generated during the interaction of said brush assembly and said moving part, said noise suppression means providing an inductive impedance between said brush assembly and an external connector, and a connector cap, electrically connected to said noise suppression means, adapted to provide a mating connection between said noise suppression means and said external connector; and said brush assembly is positioned within said housing such that sliding electrical contact is made with said moving part.

16. A brush device according to claim 15 wherein said noise suppression means comprises an electrically conductive coil wound about said housing, and said housing acts as a core for said coil.

17. A brush device for providing electrical contact with a moving part while suppressing electrical noise generated during the interaction of said brush device with the moving part, said brush device comprising:

a brush assembly, and a brush holder including a substantially tubular housing, noise suppression means, mounted on said housing and electrically connected to a brush assembly, for suppressing electrical noise generated during the interaction of said brush assembly and said moving part, said noise suppression means providing an inductive impedance in the electrical path between said brush assembly and an external connector, and a connector cap, electrically connected to said noise suppression means, adapted to provide a mating connection between said noise suppression means and said external connector; and said brush assembly is positioned within said housing such that sliding electrical contact is made with said moving part; and said brush assembly includes a brush used to make sliding electrical connection with a moving part, terminal means for connecting said brush to said noise suppression means, and spring means interposed between said terminal means and said brush for biasing said brush toward said moving part to make electrical contact therewith.

18. A brush device according to claim 17 wherein said brush assembly further includes engaging means for engaging said housing.

19. A brush device according to claim 18 wherein said housing defines an opening through which said noise suppression means is electrically connected to said terminal means, said terminal means comprises a substantially L-shaped terminal having longer and shorter portions, and a shunt wire connecting the shorter portion of said terminal to said brush, and said engaging means comprises a locking tab on the longer portion of said terminal that engages an opening in said housing when said brush assembly is inserted into said housing.

20. A brush device according to claim 17 wherein said connector cap is mounted on said housing.

* * * * *